(12) United States Patent
Akiba

(10) Patent No.: US 8,924,669 B2
(45) Date of Patent: Dec. 30, 2014

(54) INFORMATION PROCESSING APPARATUS, CONTROL METHOD, AND PROGRAM

(75) Inventor: Tomohiro Akiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/357,287

(22) Filed: Jan. 24, 2012

(65) Prior Publication Data

US 2012/0198189 A1 Aug. 2, 2012

(30) Foreign Application Priority Data

Jan. 28, 2011 (JP) ................................ 2011-016890

(51) Int. Cl.
*G06F 13/00* (2006.01)
*G06F 11/20* (2006.01)
*H04N 1/32* (2006.01)

(52) U.S. Cl.
CPC ........ *H04N 1/32363* (2013.01); *G06F 11/2069* (2013.01); *H04N 2201/0094* (2013.01)
USPC .......................................... 711/162; 711/103

(58) Field of Classification Search
CPC combination set(s) only.
See application file for complete search history.

(56) References Cited

U.S. PATENT DOCUMENTS

| 5,572,659 | A | * | 11/1996 | Iwasa et al. | 714/6.32 |
| 6,571,324 | B1 | * | 5/2003 | Elkington et al. | 711/162 |
| 2003/0208650 | A1 | * | 11/2003 | Depew et al. | 710/302 |
| 2005/0188149 | A1 | * | 8/2005 | Kaler | 711/103 |

FOREIGN PATENT DOCUMENTS

| CN | 1483164 A | 3/2004 |
| JP | H08-063298 A | 3/1996 |
| JP | 2006-252451 A | 9/2006 |
| JP | 2010-160545 A | 7/2010 |
| JP | 2010-160629 A | 7/2010 |

* cited by examiner

*Primary Examiner* — Charles Rones
*Assistant Examiner* — Han Doan
(74) *Attorney, Agent, or Firm* — Canon U.S.A., Inc. IP Division

(57) ABSTRACT

An information processing apparatus connected to first and second storage devices via a storage control apparatus is provided. The apparatus includes: an acquisition unit configured to acquire a model number of the second storage device when the storage control apparatus operates in a mirror state; a determination unit configured to determine whether the second storage device needs to be used, based on the model number acquired by the acquisition unit; and a second transfer unit configured to transfer the storage control apparatus from the mirror state to a rebuilding state if the determination unit determines that the second storage device needs to be used.

14 Claims, 6 Drawing Sheets

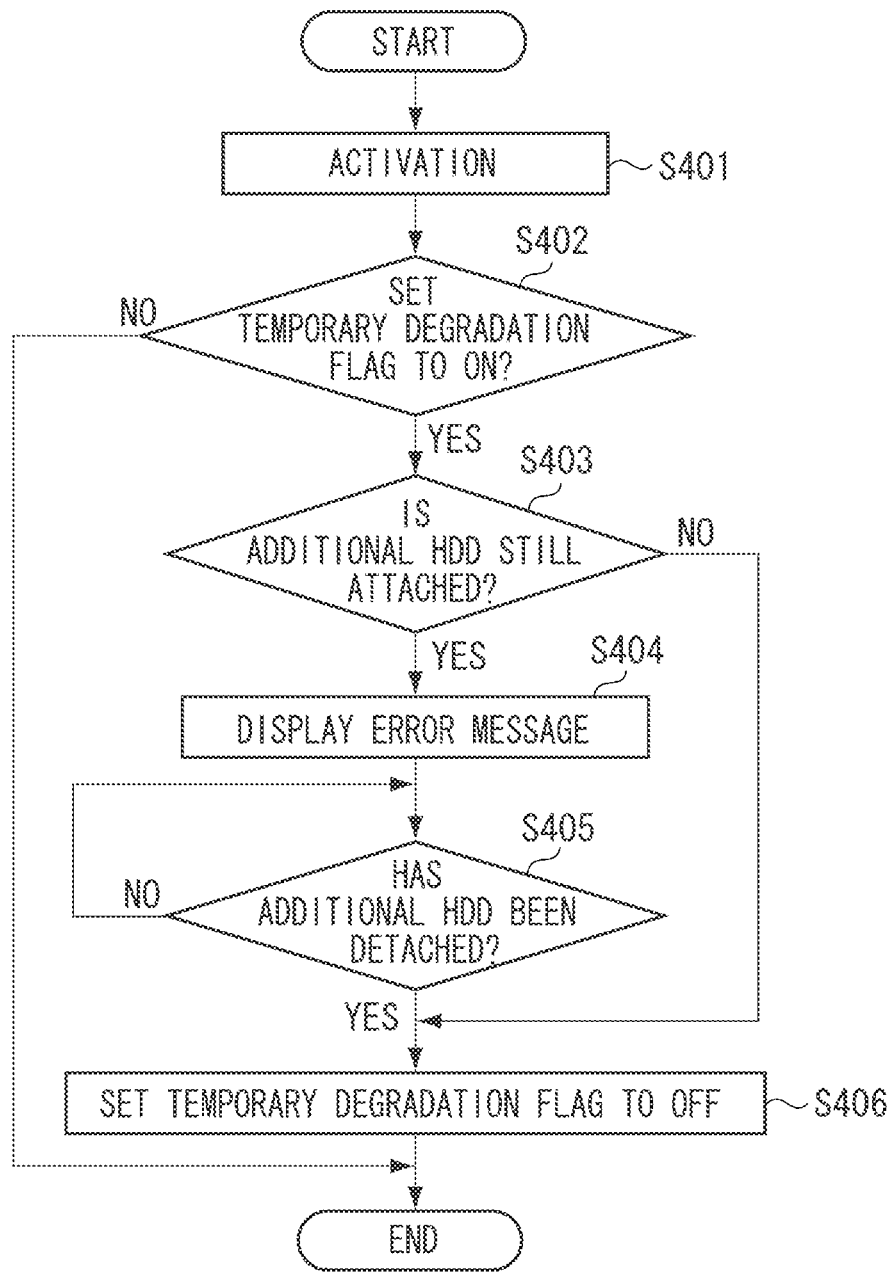

INFORMATION PROCESSING APPARATUS, CONTROL METHOD, AND PROGRAM

BACKGROUND OF THE INVENTION

1. Field of the Invention

The present invention relates to an information processing apparatus, a control method, and a program.

2. Description of the Related Art

Information processing apparatuses use hard disk drives (HDDs) as storage media. Recently, in view of operation assurance, if HDDs do not satisfy a predetermined criterion such as temperature characteristics, vibration characteristics, power consumption, radio noise, transfer rate, or storage capacity, information processing apparatuses has not accepted such HDDs. To determine whether a HDD satisfies the predetermined criterion, a model number acquired from the HDD is compared with a list of model numbers of HDDs satisfying the criterion.

Meanwhile, a technique referred to as "mirroring" is used for improving reliability of HDDs. Based on this mirroring, the same data is written in two HDDs. In this way, even if one of the HDDs fails, if the defective HDD is replaced with an additional HDD, data can be rebuilt by using the other HDD (Japanese Patent Application Laid-Open No. 2006-252451). When mirroring is executed, a main controller and two HDDs are connected to each other via a disk array apparatus inside the information processing apparatus. The disk array apparatus controls mirroring, and the main controller operates as if it recognizes that only one HDD is connected.

With this mirroring configuration, in addition to the previously attached first HDD, if the second HDD is additionally attached, the information processing apparatus checks whether the additionally attached second HDD satisfies a predetermined criterion. However, in such a case, the following problem is caused.

The disk array apparatus has a single mode in which the disk array apparatus operates with a single HDD and a mirroring mode in which the disk array apparatus operates with two HDDs. In the single mode, since the disk array apparatus only accesses a single HDD, when acquiring a model number from the additionally attached HDD, the disk array apparatus needs to transfer to the mirroring mode. However, if the disk array apparatus transfers to the mirroring mode based on a conventional method, there are cases where data is written in the additionally attached HDD before the disk array apparatus checks whether the additionally attached HDD satisfies a predetermined criterion.

SUMMARY OF THE INVENTION

The present invention is directed to checking, when the second HDD is additionally attached, whether the additionally attached second HDD satisfies a predetermined criterion while preventing data from being written in the additionally attached second HDD.

An information processing apparatus connected to first and second storage devices via a storage control apparatus includes a setting unit configured to set an initial rebuilding function of the storage control apparatus to OFF when the second storage device is connected to the storage control apparatus, a first transfer unit configured to transfer the storage control apparatus from a single mode to a mirror state after the setting unit sets the initial rebuilding function to OFF, an acquisition unit configured to acquire a model number of the second storage device when the storage control apparatus operates in the mirror state, a determination unit configured to determine whether the second storage device needs to be used, based on the model number acquired by the acquisition unit, and a second transfer unit configured to transfer the storage control apparatus from the mirror state to a rebuilding state if the determination unit determines that the second storage device needs to be used.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flow chart illustrating a control process executed when the MFP is activated (second exemplary embodiment).

DESCRIPTION OF THE EMBODIMENTS

Various exemplary embodiments, features, and aspects of the invention will be described in detail below with reference to the drawings.

There are two conceivable situations where the second HDD is additionally attached to an MFP, in addition to the first HDD that has already been attached to the MFP. The first situation is where an additional HDD is attached to execute mirroring. The second situation is where one of the HDDs fails during mirroring and the user replaces the defective HDD with an additional HDD.

The first and second situations will be described in first and second exemplary embodiments, respectively. In the first exemplary embodiment, the situation where an additional HDD is attached to execute mirroring will be described.

Figure 1:
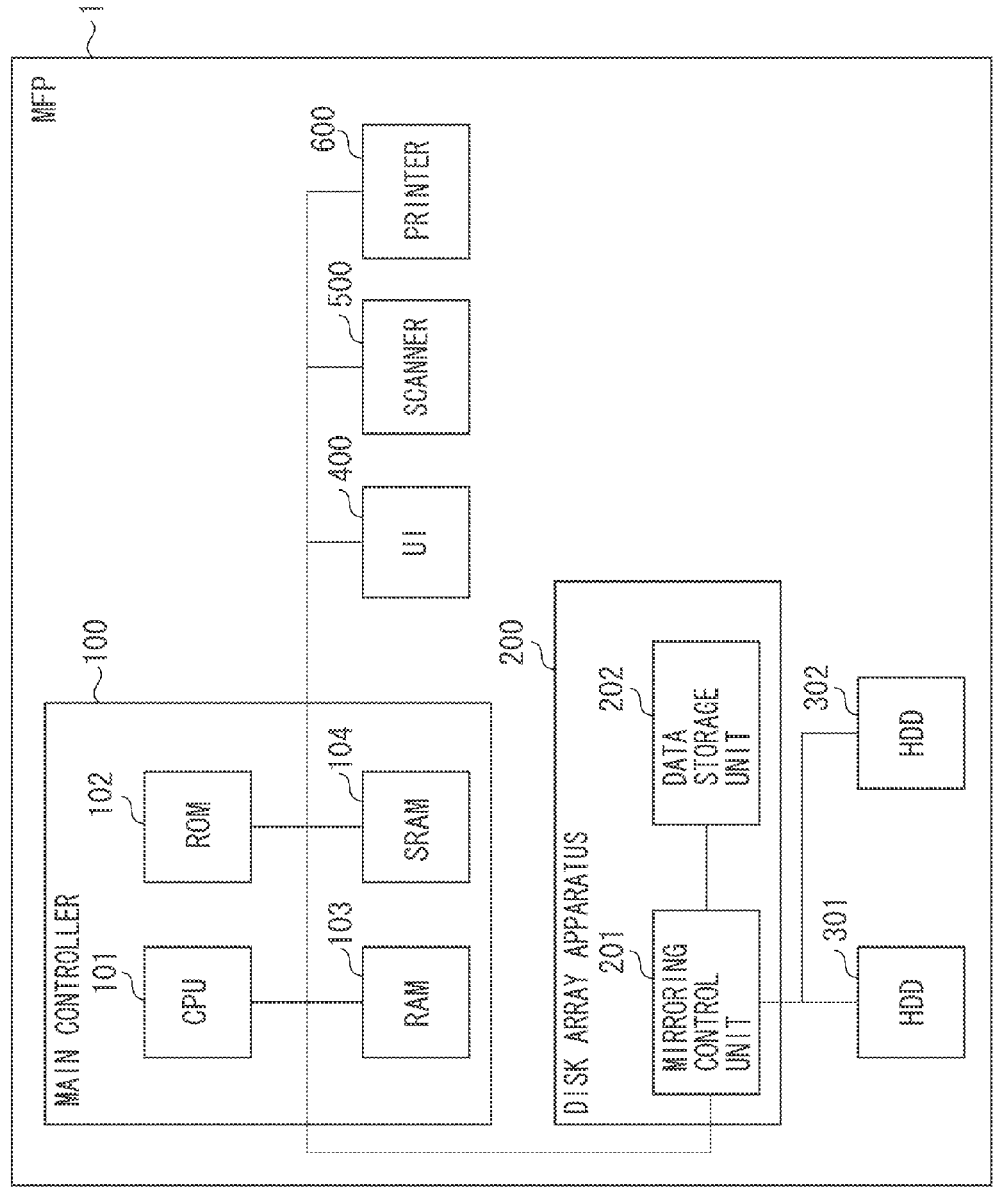
FIG. 1 is a block diagram illustrating a configuration of a multifunction peripheral (MFP).

FIG. 1 is a block diagram illustrating a configuration of an MFP 1. The MFP 1 is an example of the information processing apparatus and includes a main controller 100, a disk array apparatus 200, an HDD 301, an HDD 302, a user interface (UI) 400, a scanner 500, and a printer 600. The information processing apparatus is not limited to an MFP (for example, the apparatus may be a personal computer (PC)). The disk array apparatus 200, the HDD 301, and the HDD 302 may be present outside the MFP 1. The disk array apparatus 200 and the HDD 302 are detachably attached to the MFP 1 as options. When the disk array apparatus 200 and the HDD 302 are not attached, the HDD 301 is directly connected to the main controller 100.

The main controller 100 comprehensively controls the MFP 1. A central processing unit (CPU) 101 controls: the units in the main controller 100; the disk array apparatus 200; the UI 400; the scanner 500; and the printer 600, for example.

A read-only memory (ROM) 102 stores programs and the like used by the CPU 101. A random access memory (RAM) 103 serves as a work area and the like when the CPU 101 operates. A static random access memory (SRAM) 104 stores various data used when the CPU 101 operates.

Upon receiving instructions from the main controller 100, the disk array apparatus 200 (storage control apparatus) writes and reads data in and from the HDD 301 and the HDD 302. A mirroring control unit 201 executes mirroring of the HDD 301 and the HDD 302, which will be described with reference to FIG. 2 later. As described above, based on mirroring, the same data is written in two HDDs. In this way, even if one of the HDDs fails, data in the other HDD can be used to rebuild the data.

A data storage unit 202 stores various data used for mirroring. Examples of the data storage unit 202 include a flash ROM and an SRAM holding data with a button-type battery. The data storage unit 202 stores the types and the number of HDDs, for example.

The HDD 301 and the HDD 302 are nonvolatile storage devices for storing data. Other storage devices than HDDs such as solid state drives (SSDs) may alternatively be used. In the following description, an HDD initially connected is a first storage device, and an HDD additionally connected because of failure or the like is a second storage device.

The UI 400 presents various types of information to users via a display and receives various instructions from users via buttons or the like. The scanner 500 reads documents and inputs image data. The printer 600 executes printing, based on image data or the like supplied by the scanner 500.

Figure 2:
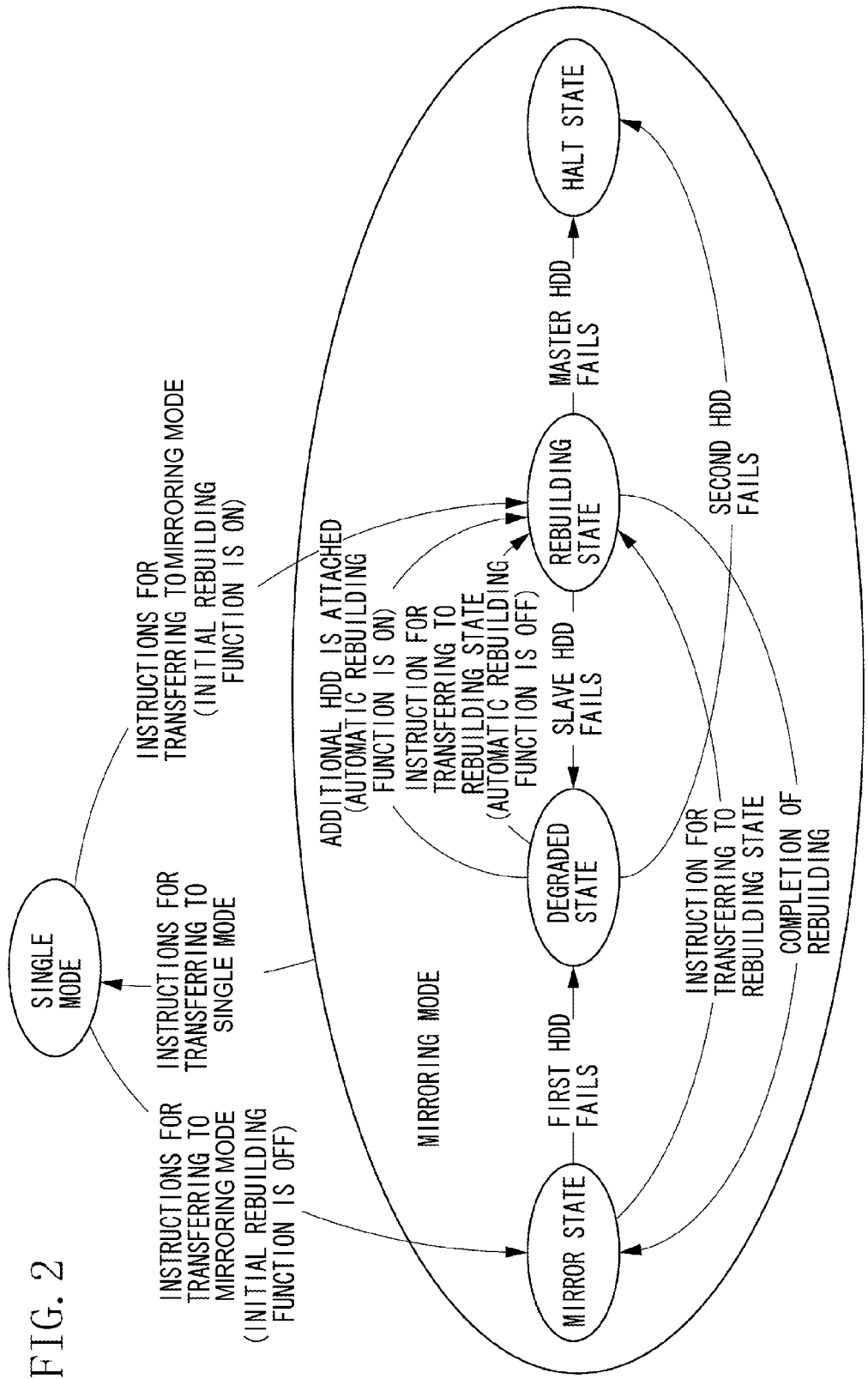
FIG. 2 is a state transition diagram of a disk array apparatus.

FIG. 2 is a state transition diagram of the disk array apparatus 200. The disk array apparatus 200 has two operation modes, which are a single mode and a mirroring mode. In the single mode, the disk array apparatus 200 operates with a single HDD attached thereto. In the mirroring mode, the disk array apparatus 200 operates with two HDDs attached thereto. The mirroring mode includes four states: a mirror state, a degraded state, a rebuilding state, and a halt state.

The mirror state is a state in which the disk array apparatus 200 properly operates with two HDDs. In the mirror state, the disk array apparatus 200 executes reading only from a master HDD, and executes writing on the master HDD and a slave HDD. In the mirror state, if one (the first HDD) of the HDDs fails, the disk array apparatus 200 transfers to the degraded state. In the mirror state, if the CPU 101 gives instructions for transferring to the rebuilding state, the disk array apparatus 200 transfers to the rebuilding state.

The degraded state is a state in which the disk array apparatus 200 operates with only one (normal HDD) of the HDDs and does not access the other HDD (defective HDD). In the degraded state, if an automatic rebuilding function is ON (default setting) and the defective HDD is replaced with an additional HDD, the disk array apparatus 200 transfers to the rebuilding state. In the degraded state, if the automatic rebuild function is OFF and the CPU 101 gives instructions for transferring to the rebuilding state, the disk array apparatus 200 transfers to the rebuilding state. In the degraded state, if the normal HDD (the second HDD) also fails, the disk array apparatus 200 transfers to the halt state.

The rebuilding state is a state in which the disk array apparatus 200 copies (rebuilds) data from one HDD (the normal HDD previously attached) to the other HDD (the HDD additionally attached that has replaced the defective HDD). In this state, the source HDD (the normal HDD previously attached) is referred to as a master HDD, and the destination HDD (the HDD additionally attached that has replaced the defective HDD) is referred to as a slave HDD.

Upon completion of rebuilding data in the rebuilding state, the disk array apparatus 200 transfers to the mirror state. If the slave HDD fails in the rebuilding state, the disk array apparatus 200 transfers to the degraded state. If the master HDD fails in the rebuilding state, the disk array apparatus 200 transfers to the halt state.

The halt state is a state in which the disk array apparatus 200 cannot continue mirroring because both of the HDDs are defective. In the single mode, if the initial rebuilding function is ON (default setting) and the user gives instructions for transferring to the mirroring mode, the disk array apparatus 200 transfers to the rebuilding state. In the single mode, if the initial rebuild function is OFF and the user gives instructions for transferring to the mirroring mode, the disk array apparatus 200 transfers to the mirror state. In any one of the above states of the mirroring mode, if the user gives instructions for transferring to the single mode, the disk array apparatus 200 transfers to the single mode.

Figure 3:
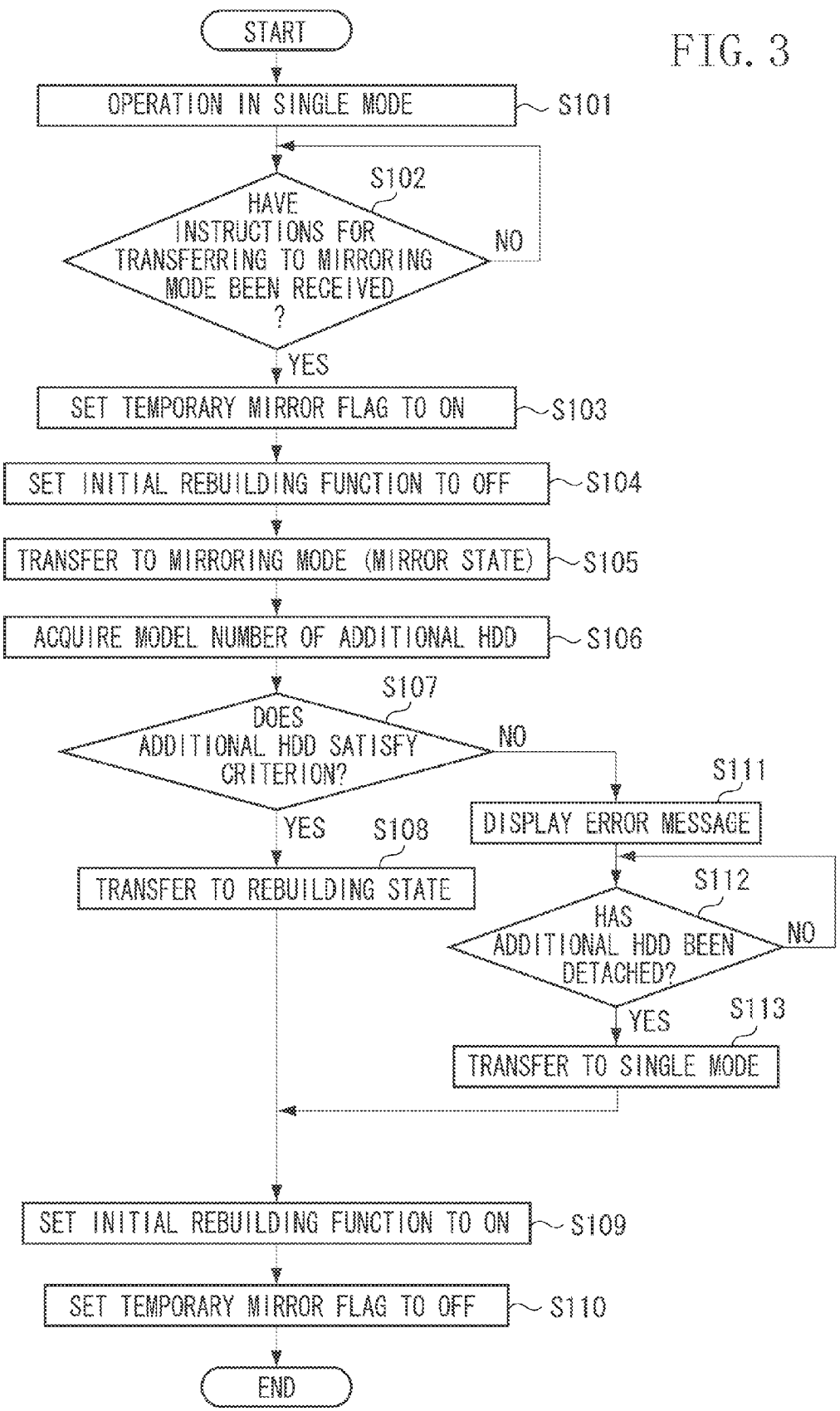
FIG. 3 is a flow chart illustrating a control process executed when an additional HDD is attached to the MFP (first exemplary embodiment).

FIG. 3 is a flow chart illustrating a control process executed when an additional HDD is attached to the MFP 1. First, in step S101, the disk array apparatus 200 operates in the single mode.

Next, in step S102, the CPU 101 determines whether the CPU 101 has received instructions for transferring to the mirroring mode from the user via the UI 400. If so (YES in step S102), the operation proceeds to step S103. If not (NO in step S102), the CPU 101 stands by until the CPU 101 receives the instructions in step S102.

If YES in step S102, in step S103, the CPU 101 accesses the SRAM 104 and sets a temporary mirror flag to ON. The temporary mirror flag is data representing successful completion of the steps after step S104.

Next, in step S104, the CPU 101 accesses the data storage unit 202 via the mirroring control unit 201 and sets the initial rebuilding function to OFF. The initial rebuilding function is a function of rebuilding data when the disk array apparatus 200 transfers from the single mode to the mirroring mode.

Next, in step S105, the CPU 101 sends instructions to the mirroring control unit 201 to transfer the disk array apparatus 200 from the single mode to the mirroring mode. This step corresponds to a first transfer. Upon receiving the instructions from the CPU 101, the mirroring control unit 201 checks ON/OFF of the initial rebuilding function stored in the data storage unit 202. Next, the mirroring control unit 201 determines one of the states in the mirroring mode and transfers the disk array apparatus 200 to the determined state. In the present exemplary embodiment, since the initial rebuilding function is set to OFF in step S104, the mirroring control unit 201 determines the mirror state as a state to which the disk array apparatus 200 is transferred. Conventionally, since the initial rebuilding function is set to ON as a default setting, the mirroring control unit 201 determines the rebuilding state as a state to which the disk array apparatus 200 is transferred. Thus, before the mirroring control unit 201 checks whether the additional HDD satisfies a criterion for use in the MFP 1, rebuilding is executed.

Next, in step S106, the CPU 101 sends instructions to the mirroring control unit 201 and acquires the model number of the additionally attached HDD. Each HDD is assigned with a unique model number, and model numbers are previously stored before the HDDs are shipped from factories, for example. When the additional HDD is attached, the mirroring control unit 201 acquires a model number from the HDD and stores the model number in the data storage unit 202. Thus, upon receiving the instructions from the CPU 101, the mirroring control unit 201 sends the model number of the additional HDD stored in the data storage unit 202 to the CPU 101.

Next, in step S107, the CPU 101 compares the model number acquired in step S106 with a list of model numbers stored in the SRAM 104, to determine whether the additional HDD satisfies a criterion for use in the MFP 1. Examples of the criterion include temperature rising characteristics, noise, power consumption, storage capacity, and access rate. More specifically, if the list of model numbers stored in the SRAM 104 includes the model number acquired in step S106, the CPU 101 determines that the additional HDD satisfies the criterion. If the list of model numbers stored in the SRAM 104 does not include the model number acquired in step S106, the CPU 101 determines that the additional HDD does not satisfy the criterion. Alternatively, instead of the model number, information representing a specification of the HDD (such as temperature characteristics, vibration characteristics, power consumption, radio noise, transfer rate, or storage capacity) may be used in steps S106 and S107. If the CPU 101 determines that the additional HDD satisfies the criterion (YES in step S107), the operation proceeds to step S108. If not (NO in step S107), the operation proceeds to step S111.

In step S108, the CPU 101 sends instructions to the mirroring control unit 201 to transfer the disk array apparatus 200 from the mirror state to the rebuilding state. This step corresponds to a second transfer. Upon receiving the instructions from the CPU 101, the mirroring control unit 201 accordingly transfers the disk array apparatus 200 to the rebuilding state.

Next, in step S109, the CPU 101 accesses the data storage unit 202 via the mirroring control unit 201 and sets the initial rebuilding function to ON. Next, in step S110, the CPU 101 accesses the SRAM 104 to set the temporary mirror flag to OFF.

If the CPU 101 determines that the additional HDD does not satisfy the criterion (NO in step S107), in step S111, the CPU 101 causes the UI 400 to display an error message to notify the user. For example, the error message represents that the additional HDD does not satisfy the criterion for use in the MFP 1 or the error message requests the user to replace the additional HDD with another HDD (an HDD satisfying the criterion for use in the MFP 1).

Next, in step S112, the CPU 101 accesses the mirroring control unit 201 to determine whether the additional HDD has been detached. If the additional HDD has been detached (YES in step S112), the operation proceeds to step S113. If the additional HDD has not been detached (NO in step S112), the CPU 101 stands by until the additional HDD is detached (YES in step S112). If YES in step S112, in step S113, the CPU 101 sends instructions to the mirroring control unit 201 to transfer the disk array apparatus 200 from the mirroring mode to the single mode. Upon receiving the instructions from the CPU 101, the mirroring control unit 201 accordingly transfers the disk array apparatus 200 to the single mode.

Figure 4:
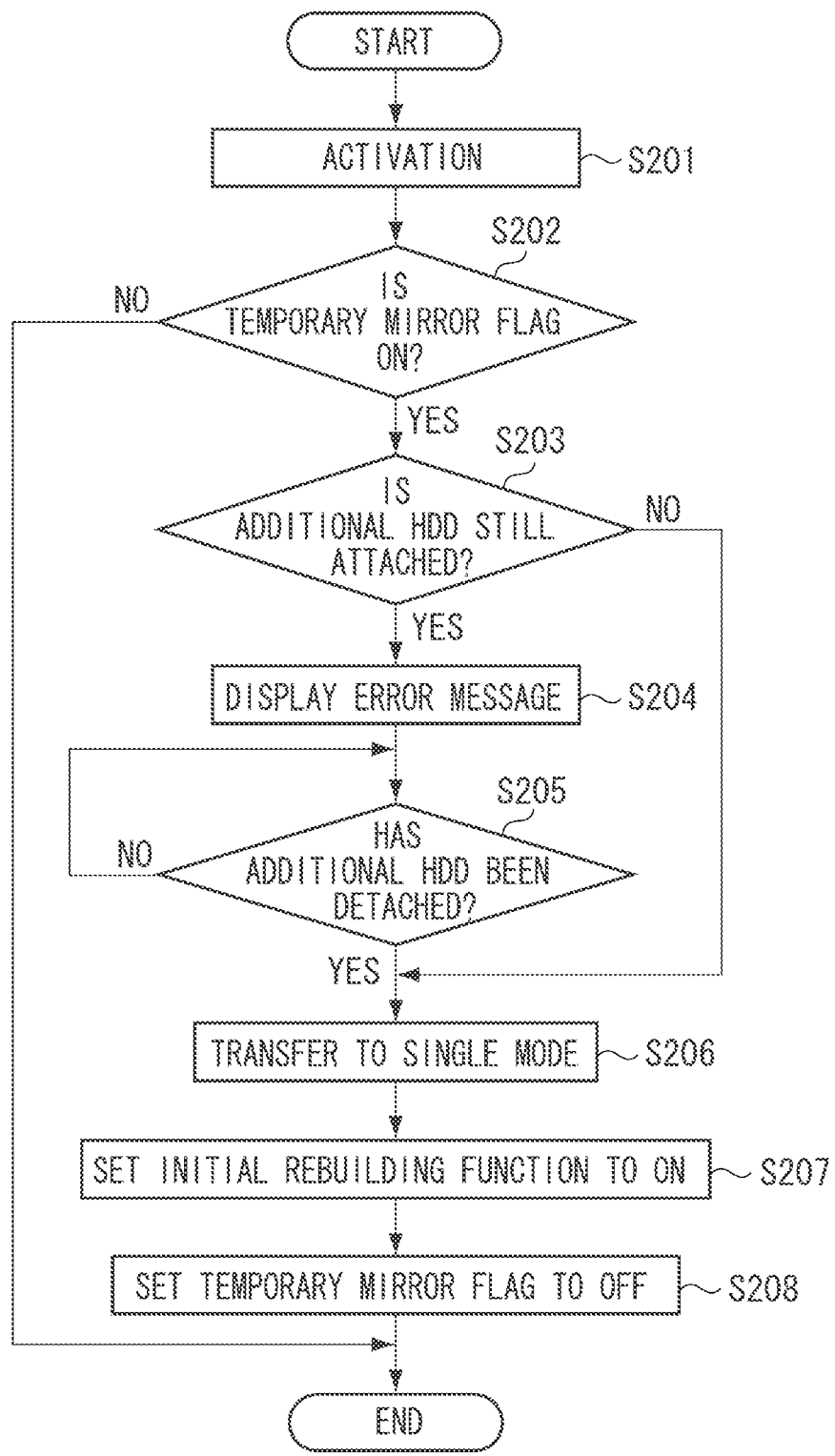
FIG. 4 is a flow chart illustrating a control process executed when the MFP is activated (first exemplary embodiment).

FIG. 4 is a flow chart illustrating a control process executed when the MFP 1 is activated. First, in step S201, the CPU 101 activates the MFP 1.

Next, in step S202, the CPU 101 accesses the SRAM 104 to determine whether the temporary mirror flag is ON. If the temporary mirror flag is ON (YES in step S202), the operation proceeds to step S203. If the temporary mirror flag is not ON (NO in step S202), the CPU 101 ends the process. In step S203, the CPU 101 accesses the mirroring control unit 201 to determine whether the additional HDD is still attached. If the additional HDD is still attached (YES in step S203), the operation proceeds to step S204. If the additional HDD is not attached (NO in step S202), the operation proceeds to step S206.

In step S204, the CPU 101 causes the UI 400 to display an error message to notify the user. For example, the error message represents that the additional HDD has not successfully been attached or the error message requests the user to replace the additional HDD with another HDD (an HDD satisfying the criterion for use in the MFP 1).

Next, in step S205, the CPU 101 accesses the mirroring control unit 201 to determine whether the additional HDD has been detached. If the additional HDD has been replaced (YES in step S205), the operation proceeds to step S206. If the additional HDD has not been replaced (NO in step S205), the CPU 101 stands by until the additional HDD is detached (YES in step S205).

If YES in step S205, in step S206, the CPU 101 sends instructions to the mirroring control unit 201 to transfer the disk array apparatus 200 from the mirroring mode to the single mode. Upon receiving the instructions from the CPU 101, the mirroring control unit 201 accordingly transfers the disk array apparatus 200 to the single mode.

Next, in step S207, the CPU 101 accesses the data storage unit 202 via the mirroring control unit 201 to set the initial rebuilding function to ON. Next, in step S208, the CPU 101 accesses the SRAM 104 to set the temporary mirror flag to OFF.

According to the first exemplary embodiment, when an additional HDD is attached to execute mirroring, rebuilding is not executed before whether the additional HDD satisfies a criterion for use in the MFP 1 is checked.

In a second exemplary embodiment, a situation where one of the HDDs fails during mirroring and the defective HDD is replaced with an additional HDD will be described. Since the second exemplary embodiment uses an MFP identical to that illustrated in FIG. 1 in the first exemplary embodiment, repetitive descriptions will be omitted. Likewise, since the state transition diagram of the disk array apparatus 200 is also the same as that in FIG. 2 in the first exemplary embodiment, repetitive descriptions will be omitted.

Figure 5:
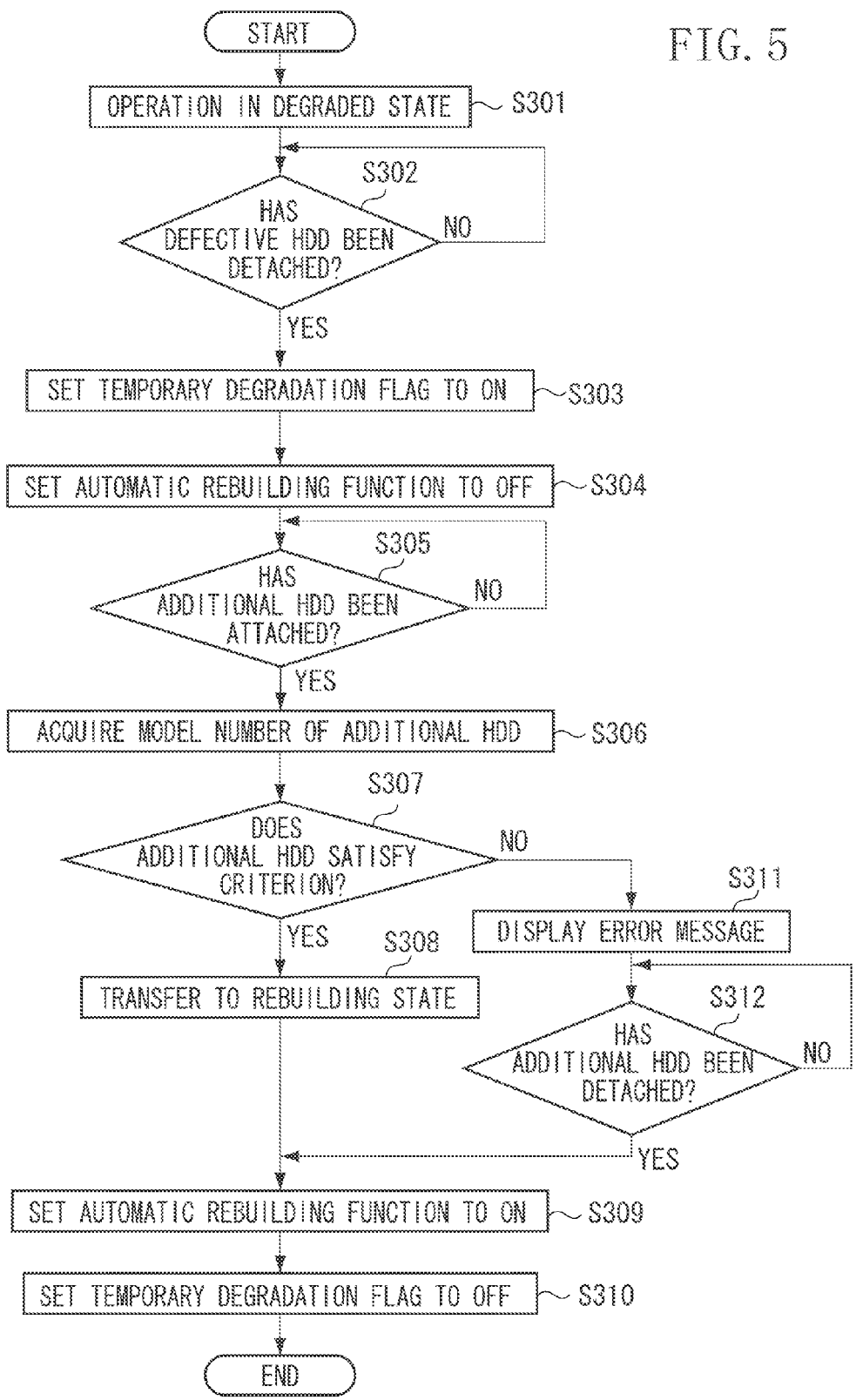
FIG. 5 is a flow chart illustrating a control process executed when an additional HDD is attached to the MFP (second exemplary embodiment).

FIG. 5 is a flow chart illustrating a control process executed when an additional HDD is attached to the MFP 1. First, in step S301, the disk array apparatus 200 operates in the degraded state.

Next, in step S302, the CPU 101 accesses the mirroring control unit 201 to determine whether the defective HDD has been detached. If the defective HDD has been detached (YES in step S302), the operation proceeds to step S303. If the defective HDD has not been detached (NO in step S302), the CPU 101 stands by until the defective HDD is detached (YES in step S302).

If YES in step S302, in step S303, the CPU 101 accesses the SRAM 104 and sets the temporary degradation flag to ON. The temporary degradation flag is data representing successful completion of the processing after step S304.

Next, in step S304, the CPU 101 accesses the data storage unit 202 via the mirroring control unit 201 and sets the automatic rebuilding function to OFF. The automatic rebuilding function is a function of executing automatically rebuilding data when an HDD is replaced in the degraded state.

Next, in step S305, the CPU 101 accesses the mirroring control unit 201 to determine whether an additional HDD has been attached. If an additional HDD has been attached (YES in step S305), the operation proceeds to step S306. If an additional HDD has not been attached (NO in step S305), the CPU 101 stands by until an additional HDD has been attached (YES in step S305). In the present exemplary embodiment, since the automatic rebuilding function is set to OFF in step S304, even if an additional HDD is attached in the degraded state, the disk array apparatus 200 is not transferred to the rebuilding state immediately. Conventionally, since the automatic rebuilding function is set to ON as a default setting, the mirroring control unit 201 transfers the disk array apparatus 200 to the rebuilding state immediately after an additional HDD is attached in the degraded state. Thus, before the mirroring control unit 201 checks whether the additional HDD satisfies a criterion for use in the MFP 1, rebuilding is executed.

Next, in step S306, the CPU 101 sends instructions to the mirroring control unit 201 and acquires the model number of the additionally attached HDD. Each HDD is assigned with a unique model number, and model numbers are previously stored before the HDDs are shipped from factories, for example. When the additional HDD is attached, the mirroring control unit 201 acquires a model number from the HDD and stores the model number in the data storage unit 202. Thus, upon receiving the instructions from the CPU 101, the mirroring control unit 201 sends the model number of the additional HDD stored in the data storage unit 202 to the CPU 101.

Next, in step S307, the CPU 101 compares the model number acquired in step S306 with a list of model numbers stored in the SRAM 104, to determine whether the additional HDD satisfies a criterion for use in the MFP 1. Examples of the criterion include temperature rising characteristics, noise, power consumption, storage capacity, and access rate. More specifically, if a list of model numbers stored in the SRAM 104 includes the model number acquired in step S306, the CPU 101 determines that the additional HDD satisfies the criterion. If not, the CPU 101 determines that the additional HDD does not satisfy the criterion. Alternatively, instead of the model number, information representing a specification of the HDD (such as temperature characteristics, vibration characteristics, power consumption, radio noise, transfer rate, or storage capacity) may be used in steps S306 and S307. If the CPU 101 determines that the additional HDD satisfies the criterion (YES in step S307), the operation proceeds to step S308. If not (NO in step S307), the operation proceeds to step S311.

If YES in step S307, in step S308, the CPU 101 sends instructions to the mirroring control unit 201 to transfer the disk array apparatus 200 from the degraded state to the rebuilding state. Upon receiving the instructions from the CPU 101, the mirroring control unit 201 accordingly transfers the disk array apparatus 200 to the rebuilding state.

Next, in step S309, the CPU 101 accesses the data storage unit 202 via the mirroring control unit 201 and sets the automatic rebuilding function to ON. Next, in step S310, the CPU 101 accesses the SRAM 104 to set the temporary degradation flag to OFF.

If the CPU 101 determines that the additional HDD does not satisfy the criterion (NO in step S307), in step S311, the CPU 101 causes the UI 400 to display an error message to the user. For example, the error message represents that the additional HDD does not satisfy the criterion for use in the MFP 1 or the error message requests the user to replace the additional HDD with an additional HDD (an HDD satisfying the criterion for use in the MFP 1).

Next, in step S312, the CPU 101 accesses the mirroring control unit 201 to determine whether the additional HDD has been detached. If the additional HDD has been detached (YES in step S312), the operation proceeds to step S313. If the additional HDD has not been detached (NO in step S312), the CPU 101 stands by until the additional HDD is detached.

FIG. 6 is a flow chart illustrating a control process executed when the MFP 1 is activated. First, in step S401, the CPU 101 activates the MFP 1. Next, in step S402, the CPU 101 accesses the SRAM 104 to determine whether the temporary degradation flag is ON. If the temporary degradation flag is ON (YES in step S402), the operation proceeds to step S403. If the temporary degradation flag is not ON (NO in step S402), the CPU 101 ends the process.

If the temporary degradation flag is ON, in step S403, the CPU 101 accesses the mirroring control unit 201 to determine whether the additional HDD is still attached. If the additional HDD is still attached (YES in step S403), the operation proceeds to step S404. If the additional HDD is not attached (NO in step S403), the operation proceeds to step S406.

If the additional HDD is still attached, in step S404, the CPU 101 causes the UI 400 to display an error message to the user. For example, the error message represents that the additional HDD has not successfully been attached or the error message requests the user to replace the additional HDD with another additional HDD (an HDD satisfying the criterion for use in the MFP 1).

Next, in step S405, the CPU 101 accesses the mirroring control unit 201 to determine whether the additional HDD has been detached. If the additional HDD has been detached (YES in step S405), the operation proceeds to step S406. If not (NO in step S405), the CPU 101 stands by until the additional HDD is detached. Next, in step S406, the CPU 101 accesses the SRAM 104 and sets the temporary degradation flag to OFF.

According to the second exemplary embodiment, even if one of the HDDs fails during mirroring and the defective HDD is replaced with an additional HDD, rebuilding is not executed before whether the additional HDD satisfies a criterion for use in the MFP 1 is checked.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-016890 filed Jan. 28, 2011, which is hereby incorporated by reference herein in its entirety.

What is claimed is:

1. An information processing apparatus for connecting to first and second storage devices via a storage control device, the information processing apparatus comprising:
   a memory;
   a processor coupled to the memory which executes the following:
   receiving, when the storage control device is in a single mode, an instruction for transferring the storage control device to a mirroring mode, from a user;
   setting, in response to receiving the instruction, a rebuilding function of the storage control device to OFF;
   sending, after the rebuilding function of the storage control device is set to OFF, a first command for transferring the storage control device to the mirroring mode, to the storage control device, wherein, when the first command is sent to the storage control device, the storage control device transfers from the single mode to a first state of the mirroring mode in which rebuilding is not automatically executed, in a case where the rebuilding function of the storage control device is set to OFF, and the storage control device transfers from the single mode to a second state of the mirroring mode in which rebuilding is automatically executed, in a case where the rebuilding function of the storage control device is set to ON, acquiring, when the storage control device is in the mirroring mode, information for determining whether the second storage device is to be used;

determining whether the second storage device is to be used, based on the information acquired; and sending, when the second storage device is to be used, a second command for transferring the storage control device to the second state of the mirroring mode, to the storage control device, wherein the storage control device transfers, when the second command is sent to the storage control device, from the first state of the mirroring mode to the second state of the mirroring mode.

2. The information processing apparatus according to claim 1, further comprising setting the rebuilding function of the storage control device to ON when the second storage device is to be used.

3. The information processing apparatus according to claim 1, further comprising setting, in a state where the information processing apparatus has been turned OFF while the rebuilding function of the storage control device had been set to OFF, the rebuilding function of the storage control device to ON if the information processing apparatus is next turned ON.

4. The information processing apparatus according to claim 1, further comprising notifying of an error when the second storage device is not to be used.

5. An information processing apparatus for connecting to first and second storage devices via a storage control device, the information processing apparatus comprising:
a memory;
a processor coupled to the memory which executes the following: detecting removing of a storage device;
setting, in response to detecting removing of the storage device, a rebuilding function of the storage control device to OFF;
detecting, after the rebuilding function of the storage control device is set to OFF, connecting of the second storage device,
wherein, when connecting of the second storage device is detected, the storage control device transfers from a first state of a mirroring mode in which rebuilding is not automatically executed to a second state of the mirroring mode in which rebuilding is automatically executed, in a case where the rebuilding function of the storage control device is set to ON, and the storage control device does not transfer from the first state of the mirroring mode to the second state of the mirroring mode, in a case where the rebuilding function of the storage control device is set to OFF,
acquiring, when connecting of the second storage device is detected, information for determining whether the second storage device is to be used;
determining whether the second storage device is to be used, based on the information acquired; and
sending, when the second storage device is to be used, a command for transferring the storage control device to the second state of the mirroring mode, to the storage control device,
wherein the storage control device transfers, when the command is sent to the storage control device, from the first state of the mirroring mode to the second state of the mirroring mode.

6. The information processing apparatus according to claim 5, further comprising setting the rebuilding function of the storage control device to ON when the second storage device is to be used.

7. The information processing apparatus according to claim 5, further comprising setting, in a state where the information processing apparatus has been turned OFF while the rebuilding function of the storage control device had been set to OFF, the rebuilding function of the storage control device to ON if the information processing apparatus is next turned ON.

8. The information processing apparatus according to claim 1, further comprising notifying an error when the second storage device is not to be used.

9. A method for controlling an information processing apparatus for connecting to first and second storage devices via a storage control device, the method comprising:
receiving, when the storage control device is in a single mode, an instruction for transferring the storage control device to a mirroring mode, from a user;
first setting of a rebuilding function of the storage control device to OFF, in response to receiving the instruction;
sending, after the rebuilding function of the storage control device is set to OFF, a first command for transferring the storage control device to the mirroring mode, to the storage control device,
wherein, when the first command is sent to the storage control device, the storage control device transfers from the single mode to a first state of the mirroring mode in which rebuilding is not automatically executed, in a case where the rebuilding function of the storage control device is set to OFF, and the storage control device transfers from the single mode to a second state of the mirroring mode in which rebuilding is automatically executed, in a case where the rebuilding function of the storage control device is set to ON,
acquiring, when the storage control device is in the mirroring mode, information for determining whether the second storage device is to be used from the second storage device;
determining whether the second storage device is to be used, based on the information acquired in the acquisition operation; and
sending, when the second storage device is to be used, a second command for transferring the storage control device to the second state of the mirroring mode, to the storage control device,
wherein the storage control device transfers, when the second command is sent to the storage control device, from the first state of the mirroring mode to the second state of the mirroring mode.

10. A method for controlling an information processing apparatus for connecting to first and second storage devices via a storage control device, the method comprising:
first detecting removal of a storage device;
first setting of a rebuilding function of the storage control device to OFF, in response to detecting removal of the storage device;

second detecting, after the rebuilding function of the storage control device is set to OFF, connecting of the second storage device, wherein, when connecting of the second storage device is detected, the storage control device transfers from a first state of a mirroring mode in which rebuilding is not automatically executed to a second state of the mirroring mode in which rebuilding is automatically executed, in a case where the rebuilding function of the storage control device is set to ON, and the storage control device does not transfers from the first state of the mirroring mode to the second state of the mirroring mode, in a case where the rebuilding function of the storage control device is set to OFF, acquiring, when connecting of the second storage device is detected, information for determining whether the second storage device is to be used;

determining whether the second storage device is to be used, based on the information acquired by the acquisition unit; and sending, when the second storage device is to be used, a command for transferring the storage control device to the second state of the mirroring mode, to the storage control device, wherein the storage control device transfers, when the command is sent to the storage control device, from the first state of the mirroring mode to the second state of the mirroring mode.

11. A non-transitory computer-readable storage medium storing a program for causing an information processing apparatus for connecting to first and second storage devices via a storage control device, to execute following operations:

receiving, when the storage control device is in a single mode, an instruction for transferring the storage control device;

first setting, in response to receiving the instruction, a rebuilding function of the storage control device to OFF;

sending, after the rebuilding function of the storage control device is set to OFF, a first command for transferring the storage control device to the mirroring mode, to the storage control device, wherein, when the first command is sent to the storage control device, the storage control device transfers from the single mode to a first state of the mirroring mode in which rebuilding is not automatically executed, in a case where the rebuilding function of the storage control device is set to OFF, and the storage control device transfers from the single mode to a second state of the mirroring mode in which rebuilding is automatically executed, in a case where the rebuilding function of the storage control device is set to ON, acquiring, when the storage control device is in the mirroring mode, information for determining whether the second storage device is to be used, from the second storage device;

determining whether the second storage device is to be used, based on the information acquired in the acquisition operation; and sending, when the second storage device is to be used, a second command for transferring the storage control device to the second state of the mirroring mode, to the storage control device, wherein the storage control device transfers, when the second command is sent to the storage control device, from the first state of the mirroring mode to the second state of the mirroring mode.

12. A non-transitory computer-readable storage medium storing a program for causing an information processing apparatus for connecting to first and second storage devices via a storage control apparatus, to execute following operations:

first detecting removal of a storage device;

first setting, in response to detecting removal of the storage device, a rebuilding function of the storage control device to OFF;

second detecting, after the rebuilding function of the storage control device is set to OFF, connecting of the second storage device, wherein, when connecting of the second storage device is detected, the storage control device transfers from a first state of a mirroring mode in which rebuilding is not automatically executed to a second state of the mirroring mode in which rebuilding is automatically executed, in a case where the rebuilding function of the storage control device is set to ON, and the storage control device does not transfers from the first state of the mirroring mode to the second state of the mirroring mode, in a case where the rebuilding function of the storage control device is set to OFF, acquiring, when connecting of the second storage device is detected, information for determining whether the second storage device is to be used;

determining whether the second storage device is to be used, based on the information acquired by the acquisition unit; and sending, when the second storage device is to be used, a command for transferring the storage control device to the second state of the mirroring mode, to the storage control device, wherein the storage control device transfers, when the command is sent to the storage control device, from the first state of the mirroring mode to the second state of the mirroring mode.

13. The information processing apparatus according to claim 1, wherein the first state is a mirror state, and the second state is a rebuilding state.

14. The information processing apparatus according to claim 5, wherein the first state is a degraded state, and the second state is a rebuilding state.

* * * * *